United States Patent [19]

Rushing et al.

[11] Patent Number: 5,280,473
[45] Date of Patent: Jan. 18, 1994

[54] MODEM WITH ECHO CANCELLATION

[75] Inventors: Mickey C. Rushing, Harvest; Steven R. Blackwell, Huntsville, both of Ala.

[73] Assignee: Universal Data Systems, Inc., Huntsville, Ala.

[21] Appl. No.: 897,184

[22] Filed: Jun. 11, 1992

Related U.S. Application Data

[63] Continuation-in-part of Ser. No. 477,282, Feb. 8, 1990, abandoned.

[51] Int. Cl.⁵ .............................................. H04L 5/14
[52] U.S. Cl. ..................................... 370/32.1; 379/410
[58] Field of Search ................. 370/32.1; 379/410, 411

[56] References Cited

U.S. PATENT DOCUMENTS

| | | | |
|---|---|---|---|
| 4,072,830 | 2/1978 | Gitlin et al. .......................... | 370/32.1 |
| 4,742,510 | 5/1988 | Quatieri, Jr. et al. ............... | 370/32.1 |
| 4,777,640 | 10/1988 | Turner et al. ........................ | 375/118 |
| 4,970,715 | 11/1990 | McMahan ............................ | 370/32.1 |

OTHER PUBLICATIONS

Richard Gitlin and John Thompson, "A Phase Adaptive Structure for Echo Cancellation", Aug. 1978, IEEE Transactions on Communications, vol. COM-26, No. 8, pp. 1211-1220.

Thomas Quatieri and Gerald O'Leary, "Far-Echo Cancellation in the Presence of Frequency Offset", Jun. 1989, IEEE Transactions on Communications, vol. 37, No. 6, pp. 635-644.

Primary Examiner—Douglas W. Olms
Assistant Examiner—Melvin Marcelo
Attorney, Agent, or Firm—Wayne J. Egan

[57] ABSTRACT

A modem receiver includes an echo canceller (122), the echo canceller including a near-end echo canceller (128) and a far-end echo canceller (130). The echo canceller also includes a phase jitter tracker (154) arranged to track and generate a phase jitter component associated with the far-end echo.

12 Claims, 3 Drawing Sheets

$\overline{Y}(n)$ = ROTATED ECHO REPLICA
$Z(n)$ = RECEIVED SIGNAL(ECHO+NOISE)
$\phi$ = ANGLE ERROR
$\phi_C(n)$ = ANGLE ERROR WITH JITTER CORRECTION REMOVED
$\Theta_j(n)$ = JITTER TRACKER PHASE OUTPUT
$\omega_0$ = CARRIER LOOP CUTOFF FREQUENCY
$a$ = CARRIER LOOP DAMPING COEFICIENT
$T$ = SAMPLE INTERVAL(1/Fs)
$\Theta_f(n)$ = CARRIER LOOP FREQUENCY TERM
$\Theta_p(n)$ = CARRIER LOOP PHASE TERM
$\Theta(n)$ = PHASE OUTPUT
$\Theta_C(n)$ = TOTAL CARRIER LOOP PHASE CORRECTION

*FIG.3*

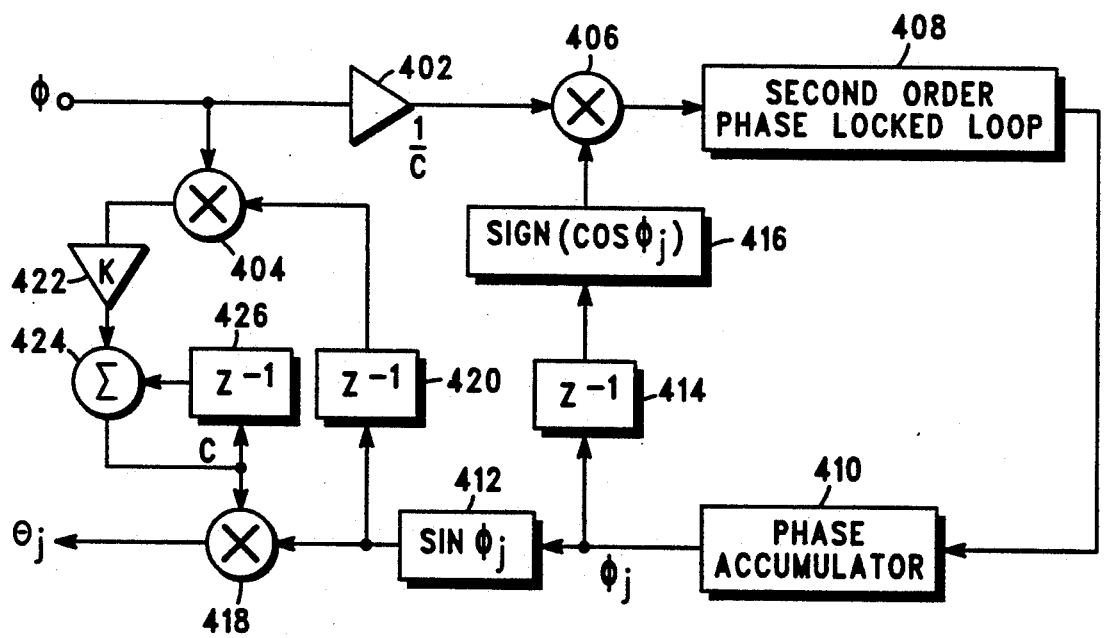

*FIG.4*

MODEM WITH ECHO CANCELLATION

CROSS-REFERENCE TO RELATED APPLICATION

This is a continuation-in-part of prior application Ser. No. 07/477,282, filed Feb. 8, 1990, now abandoned, by Mickey Cleveland Rushing and Steven Ray Blackwell, the same inventors as in the present application, which prior application is assigned to Universal Data Systems, Inc., the same assignee as in the present application, and which prior application is hereby incorporated by reference verbatim, with the same effect as though the prior application were fully and completely set forth herein.

FIELD OF THE INVENTION

This application relates to modems including, but not limited to, a modem with echo cancellation.

BACKGROUND OF THE INVENTION

Presently, modems are used to transport digital data between data terminal equipment such as personal computers, workstations and the like, over channels, such as telephone lines. Typically, the communication signal includes digital data in the form of a carrier signal that is modulated by a predetermined transmit constellation of signal points. Each signal point of the transmit constellation represents a digital code or value to be transported. At the sending modem, a carrier signal is thus modulated at the constellation signal point corresponding to the digital code or value to be transported over the channel. At the receiving modem, the modulated carrier signal may include distortion and other impairments induced as a result of the transmission process. The carrier signal is removed, and a received signal point is then identified from a receive constellation. The digital code or value represented by the signal point may then be obtained from a memory device, such as a look-up table.

The present application is directed to modems employing echo cancellation and may be used, for example, with a full duplex modem. Briefly, a modem with echo cancellation, in accordance with the present invention, is especially applicable for modems having echo cancellers in which the echoes to be cancelled have a substantial phase jitter component.

Echo cancellers enable modems to operate in a full-duplex mode over two-wire lines at higher data rates than would otherwise be practical without echo cancellation. As used herein, the term "echoes" refers to undesirable reflections of a locally-transmitted signal. These reflections are primarily due to impedance discontinuities in the communication channel. For example, such discontinuities often result at an interface between the line and other equipment. Multiple echoes may result when multiple discontinuities are present such as at a local telephone central office, a remote telephone central office, or at the remote line termination. Also, it is well-known that the use of a satellite link in a communication system provides a substantial time delay, and hence echoes, with substantial time delays.

A "near-end" echo refers to an echo having a relatively small time delay, which typically results due to the nearest line discontinuity, such as at the local telephone central office. A "far-end" echo is an echo with a substantially longer time delay, which results from remote line discontinuities. Because the near-end echo has travelled a relatively short distance, it is not common for the near-end echo to have substantial phase jitter.

Near-end and far-end echo cancellers are discussed, for example, in Dennis B. McMahan, "Modem with Improved Remote Echo Location and Cancellation," U.S. Pat. No. 4,970,715, which patent issued on Nov. 13, 1990, which patent is assigned to Universal Data Systems, Inc., the same assignee as in the present application, and which patent is hereby incorporated by reference verbatim, with the same effect as though the same patent were fully and completely set forth herein.

As used herein, "phase jitter" of an echo refers to an echo having a varying phase relative to the phase of the corresponding transmitted signal. One common cause of phase jitter is the coupling of 60 Hertz ("Hz") alternating current ("AC") signal and its harmonics to telephone lines carrying the modem signal. Thus, the 60 Hz AC signal (or its harmonics) modulate the communications signals. Far-end echoes, which must travel substantial distances, thus have a greater chance of including undesired phase jitter.

As is known, the receiver of a modem determines what digital data was transmitted based on the received signal. A receiver may also include an equalizer which attempts to compensate for non-linear amplitude versus frequency characteristics of the communications channel. It is also common for the receiver to include a phase-locked loop ("PLL") to track the carrier frequency of the received signal. A receiver including a frequency-adaptive phase jitter canceller is discussed, for example, in Michael D. Turner et al., "Frequency Adaptive Phase Jitter Canceler," U.S. Pat. No. 4,777,640, which patent issued on Oct. 11, 1988, which patent is assigned to Universal Data Systems, Inc., the same assignee as in the present application, and which patent is hereby incorporated by reference verbatim, with the same effect as though the same patent were fully and completely set forth herein.

A modem echo canceller operates on received or incoming signals and provides an output signal to the receiver in which echoes have been minimized. The echo cancellation function is very important as failure to substantially cancel incoming echoes will result in the receiver having to function with undesired echo signals present in the received signal.

Conventional echo cancellers develop an echo replica signal which corresponds to the average phase and amplitude of the received echoes. The replica signal is then subtracted from the incoming signal which contains desired signals and echoes, thereby cancelling the echoes. Because phase jitter creates varying phases about the average phase of the echo, conventional echo cancellers have not been able to generate a true echo replica which includes the phase jitter variations.

The problem of phase jitter in echo cancellation was recognized, for example, in Gitlin et al., U.S. Pat. No. 4,072,830, dated Feb. 7, 1978 ("Gitlin"), at column 1, lines 11-34. Gitlin is typical of a number of prior approaches to echo cancellation which include, as an integral part of the echo cancelling mechanism, a second order phase locked loop. These systems are capable of removing both constant and time-varying phase shifts introduced by the echo path, up to the limits of the algorithm for ensuring loop stability. See, Gitlin, column 6, lines 8-16. In practice, these systems can typically cancel frequency offset of as much as 10 Hz and remove phase jitter in the frequency range of 1 to about 10 Hz. However, phase jitter is typically caused as a result of cross talk from power lines or from telephone company ring generators, which tend to produce phase jitter in the 50–60 Hz region and in the 15–25 Hz region, respectively. Second and third harmonics often accompany these primary frequencies, as well.

In summary, prior modem echo cancellers have been limited in their capacity to address phase jitter, especially when channels having substantial phase jitter are encountered.

Thus there exists a need for a modem with improved echo cancellation which particularly addresses phase jitter.

BRIEF DESCRIPTION OF THE DRAWINGS

FIG. 3 is a table for FIG. 2.

FIG. 4 depicts a jitter tracker for the first embodiment.

DETAILED DESCRIPTION

Figure 1:
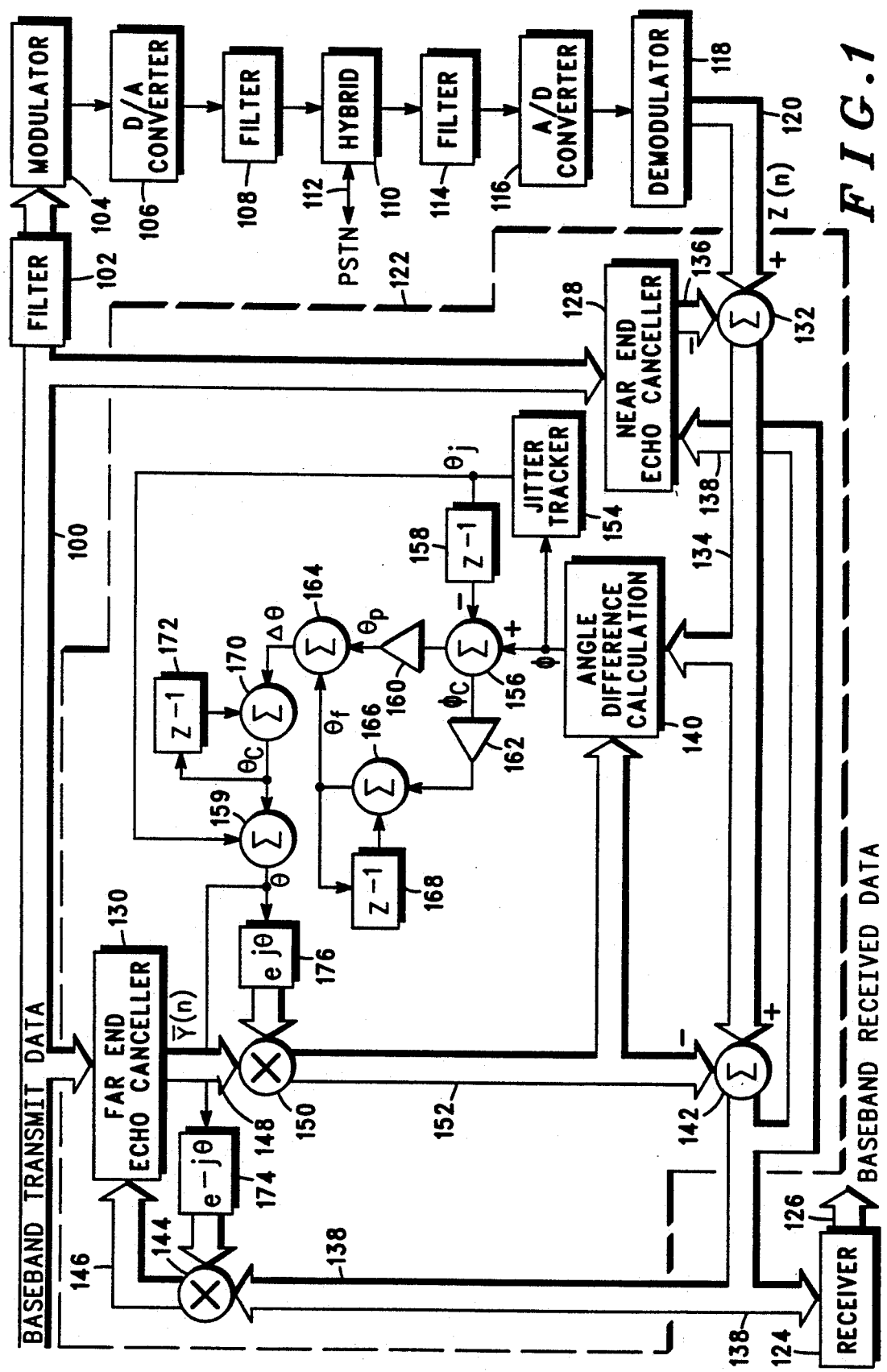
FIG. 1 is a block diagram that shows a first embodiment of a modem with echo cancellation, in accordance with the present invention.

FIG. 1 shows a modem in which digital baseband data to be transmitted is received from a source via a bus 100. The data is filtered by a filter 102, prior to being modulated by a modulator 104. The digital output of modulator 104 is converted to an analog signal by a digital-to-analog ("D/A") converter 106. The analog information is then filtered by a filter 108 before being coupled to a hybrid 110.

The hybrid 110 couples transmitted signals to a two-way communication channel such as a public switched telephone network ("PSTN") 112, and to couple received or incoming signals from the PSTN to a filter 114. The filtered received signals are transformed into digital signals by an analog-to-digital ("A/D") converter 116. The digital output of A/D converter 116 is demodulated by a demodulator 118. The digital output of the demodulator is coupled to a bus 120, which provides an input to an echo canceller 122. The baseband transmit data carried on the bus 100 also comprises an input to the canceller 122. The digital signals on bus 120 consist of the data received from a remote modem and echoes of the locally transmitted signals, delayed in time relative to the time the corresponding data was transmitted.

Ideally, the canceller 122 should cancel all echo components, so that only the desired received data from the remote modem (not shown) would be presented to the receiver 124. The purpose of the receiver 124 is to further process these digital signals and provide a baseband digital output at a line 126 which consists of the data transmitted from the remote modem.

The illustrated embodiment of the canceller 122 includes a near-end echo canceller 128 and a far-end echo canceller 130. The canceller 128 and the canceller 130 may be, for example, conventional embodiments; also, they may be, for example, substantially identical to each other.

The far-end canceller 130 will include a delay element so that the echoes more remote in time can be corrected by delaying the original data at bus 100 by an appropriate time interval to coincide with those returning echoes. The near-end echo canceller 128 deals primarily with echoes occurring within a relatively short time interval from the time the original data is transmitted.

A summer 132 subtracts the output of the canceller 128 from the received data on bus 120 to provide an output at bus 134. The purpose of the canceller 128 is to produce an echo replica signal on bus 136 such that, when added to the signal on bus 120, the result is substantial cancellation of the near-end echo. The bus 138 carries a feedback signal which represents the output of the canceller 130 to the canceller 128.

The near-end echo-corrected data signal on bus 134 is coupled to angle difference calculator 140 and summer 142. The output of summer 142, which provides a difference output, constitutes the signal coupled to bus 138, which is the input to receiver 124. Bus 138 is also connected to a multiplier 144 which provides an output 146 comprising a feedback input signal to far-end echo canceller 130. Bus 148 carries the output from far-end echo canceller 130 and consists of a far-end echo replica signal corresponding to the far-end echo to be cancelled. Multiplier 150 multiplies the output from the far-end canceller 130 with another signal to provide an output on bus 152 comprising an input to summer 142.

The tracking and generation of a phase jitter component associated with the far-end echo is described as follows. The signal on bus 152 provides an input to angle difference calculator 140 which computes the phase or angle difference $\phi$ between the signal on bus 152 and the signal on bus 134. Thus, the output from calculator 140 consists of a number representing the phase difference between these two signals. This phase signal provides an input to the phase jitter tracker 154 and the summer 156.

The purpose of the phase jitter tracker 154 is to provide an output value representative of the echo phase jitter $\theta_j$. An embodiment of the phase jitter tracker 154 is shown in FIG. 4. The phase jitter tracker depicted in Michael D. Turner et al., "Frequency Adaptive Phase Jitter Canceler," U.S. Pat. No. 4,777,640, as incorporated by reference hereinabove, is also suitable for use. Other embodiments of phase jitter trackers are also believed to be suitable. The $\theta_j$ signal is delayed by a delay element 158 and coupled as an input to the summer 156. The $\theta_j$ signal is also an input to the summer 159.

A second order phase locked loop ("PLL") is implemented as follows. The output $\phi_c$ of summer 156 is coupled to magnitude scaling elements 160 and 162. The output of element 160 is coupled to summer 164. The output of element 162 is received as an input to an accumulator consisting of summer 166 and delay element 168. The output of the accumulator represents a frequency phase component $\theta_f$ and provides an input to summer 164. The output of summer 164 consist of a value corresponding to $\Delta\theta$, which consists of the summation of phase components $\theta_p$, representing the phase component of the carrier loop, as determined by the PLL, and $\theta_f$, corresponding to a frequency component of the carrier loop, as determined by the PLL.

The output from the summer 164 consisting of $\Delta\theta$ is coupled to an accumulator consisting of summer 170 and delay element 172. The output of this accumulator $\theta_c$ provides an input to summer 159. The output $\theta$ of summer 159 consists of a value corresponding to the total phase associated with the far-end echo present on bus 134. It will be appreciated that $\theta$ includes adjustments generated by both the carrier loop and the phase jitter tracker.

The total phase $\theta$ is transformed into a phasor by converter 174 which provides an output of the form $e^{-j\theta}$, which forms an input to multiplier 144. Multiplying the signal on 138 by the indicated phasor produces an output on bus 146 in which the effects of both the phase jitter tracker and the carrier loop have been removed. This allows the far-end echo canceller to produce a more accurate echo replica and hence greater far-end echo cancellation.

The total phase $\theta$ is also transformed into a phasor by converter 176 in the form of $e^{j\theta}$, which provides an input to multiplier 150. The purpose of multiplying this phasor times the output of the far-end echo canceller signal on bus 148 (the echo replica signal) is to impose the existing phase jitter and carrier loop adjustment thereon so that when subtracted by summer 142 from the received signal on bus 134, the same phase relationship is established so that cancellation occurs. It is important that the phase jitter and carrier loop adjustment which is imposed on the echo replica signal at the output of the far-end echo canceller be removed at the input to the far-end echo canceller in order to achieve proper cancellation.

With regard to the previously-described second order PLL, it is also desirable to decouple $\theta_j$ from the $\theta_f$ and $\theta_p$ signals generated by the second-order loop, since $\theta_j$ is added at summer 159 to constitute $\theta$. The feedback path of $\theta_j$ through delay element 158 cancels the last $\theta_j$ for the $\theta_f$ and $\theta_p$ calculation. This effectively isolates the phase jitter component and prevents it from adversely impacting on the operation of the second order PLL, which tracks carrier frequency and phase offset.

It will be noted that the echo-compensated signal on bus 138 is utilized as the input feedback signal to the near-end echo canceller 128. This selected rather than utilizing the signal present on bus 134 in order to achieve a better feedback signal on which to base the near-end cancellation. It will be apparent that the signal on 138 includes the benefit of far-end echo cancellation.

The isolation and use of the phase jitter component $\theta_j$, when combined with the other phase components to form $\theta$, allows the feedback input to echo canceller 130 to be substantially free from the phase jitter component, and hence to achieve a higher degree of echo cancellation since the phase jitter components will not adversely impact its operation. In order to achieve the proper cancellation, the removed phase jitter component is reinserted on the echo replica signal output from canceller 130 so that cancellation is achieved by the difference provided by summer 142 with the received signal on bus 134 which contains an undesired echo with phase jitter.

It will be apparent that the same technique applied with regard to far-end echo canceller 130 could be also utilized with near-end echo canceller 128. However, since the near-end echoes are less likely to have substantial phase jitter associated with them, the benefit of the teachings of a modem with echo cancellation, in accordance with the present invention, may not be sufficient to justify incorporation. It should also be apparent that a single large-scale echo-canceller with a substantial number of taps in order to span both near-end and far-end echoes could benefit by application of the teachings of a modem with echo cancellation, in accordance with the present invention.

FIG. 4 shows an embodiment of phase jitter tracker 154 which derives the phase jitter component $\theta_j$ from the angle difference $\phi$. The phase jitter is assumed to have at least a sinusoidal component that is tracked by the jitter tracker 154. This is almost always a valid assumption, since the largest component of phase jitter is normally related to power line frequencies.

The magnitude of input $\phi$ is preferably scaled by a scaler 402 by a factor of 1/C. The scaled output is input to multiplier 406. A second-order PLL 408 receives the output of multiplier 406 and provides a combined first and second order phase output to phase accumulator 410. The output of the accumulator $\phi_j$ forms an input to sine calculator 412 and delay element 414. Calculator 416 determines the sign of cos ($\phi_j$) from the delayed output $\phi_j$ of delay 414. The output from calculator 416 is a one-bit value that is input to multiplier 406. This represents an orthogonal component to the sinusoidal jitter $\theta_j$ so that the output of multiplier 406 will approach zero after a large number of samples.

The output of sine calculator 412 is a numerical value corresponding to the phase of $\theta_j$ which was in radians. This output forms inputs to delay element 420 and multiplier 418. Multiplier 404 multiplies the delayed value from delay element 420 times the angle difference $\phi$ and provides the resulting output to scaler 422, which uses a gain of K. Summer 424 and delay element 426 form an accumulator based on the output of scaler 422. The output C of the accumulator is the other input to multiplier 418. Its output is phase jitter $\theta_j$, expressed in radians.

The scale factor of 1/C works in cooperation with the gain of C to scale the magnitude of the $\theta_j$ component so that the PLL only has to accommodate a limited range of magnitudes. However, it will be apparent to those skilled in the art that such scaling may be omitted depending on the particular PLL implemented.

Figure 2:
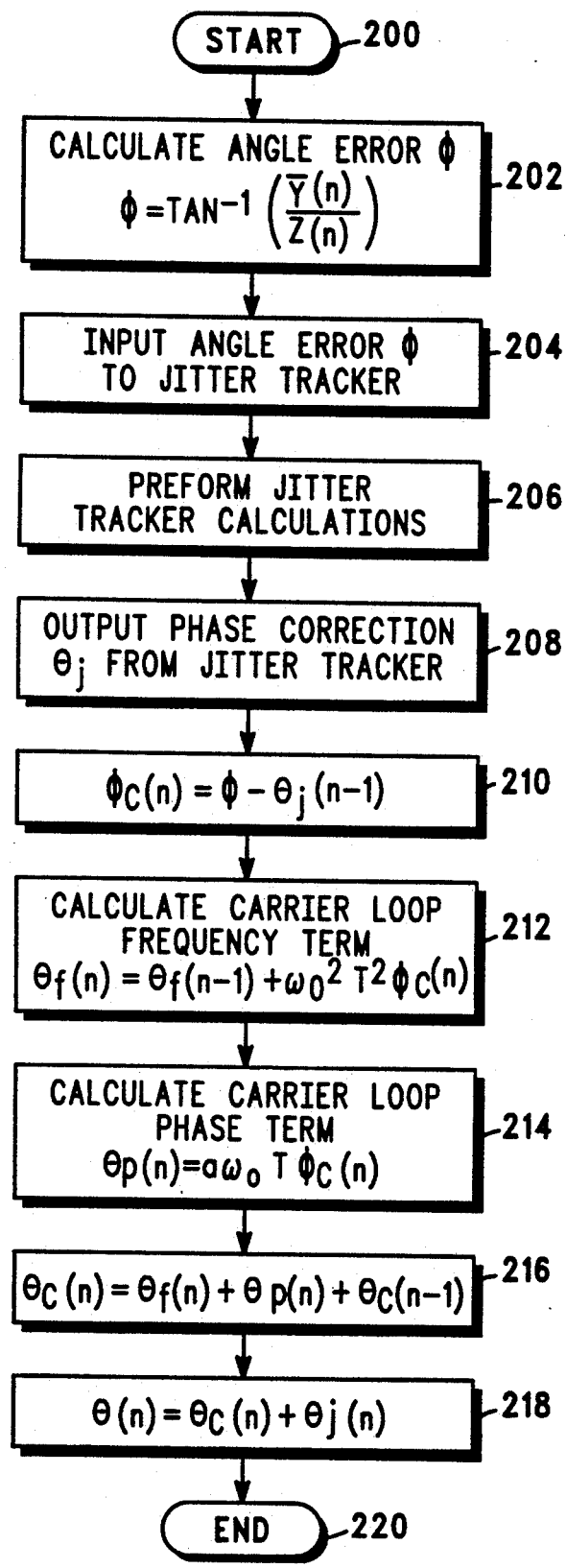
FIG. 2 is a flow diagram for the first embodiment.

FIG. 2 is a flow diagram comprising steps in a digital computing technique for calculating the total phase $\theta$ in accordance with the teachings of a modem with echo cancellation, in accordance with the present invention. References to "PLL" in the description relating to FIGS. 2 and 3 refer to the PLL in FIG. 1, as opposed to the phase jitter tracker 154.

The process begins at start, step 200. The angle difference $\phi$ is calculated by using an inverse tangent calculation as defined in calculation block 202. It should be noted that the terms utilized in this flow diagram are defined in the table shown in FIG. 3.

After calculating the angle difference $\phi$, it is input to phase jitter tracker 154 by step 204. Step 206 indicates the jitter tracker 154 calculates the phase jitter $\theta_j$. Step 208 represents the output phase jitter $\theta_j$ is calculated, and thus available for use. The jitter tracker phase for the previous sample $\theta_j(n-1)$ is subtracted from the angle difference in step 210 to yield the angle error with the phase jitter correction removed.

The PLL frequency term is defined in step 212. The PLL phase term is defined in step 214. The phase term $\theta_c$ is defined and calculated in step 216. The total phase $\theta(n)$ is defined and calculated in step 218 to consist of the sum of $\theta_c$ and $\theta_j$. End step 220 indicates that the program has completed calculations for one sample (baud). It will be apparent that this program would be utilized on a sample-by-sample or baud-by-baud basis in which phase calculations are made and utilized. This operation would likely be incorporated as part of other digital operations associated with the modem.

FIG. 3 depicts a definition of terms used in FIG. 2. These terms are not believed to require further explanation beyond the definitions as provided. Scaling element 162 consists of $\omega_0^2 T^2$ and scaling factor 160 consists of $a\omega_0 T$. It will be apparent to those skilled in the art that the mathematical representation of (n) represents the calculations made upon a particular sample, while (n−x) represents previous values or calculations, and (n+x) represents subsequent values or calculations.

While various embodiments of a modem with echo cancellation, in accordance with the present invention, have been described hereinabove, the scope of the invention is defined by the following claims.

What is claimed is:

1. A modem comprising:
   transmitter means for converting digital data into a transmit ("TX") signal and for transmitting the TX signal via a channel;
   receiver means coupled to the channel for receiving incoming signals transmitted from a remote modem, the incoming signals including an echo of the TX signal, thus forming a received echo;
   echo cancelling means coupled to the receiver means for substantially cancelling the received echo, the echo cancelling means including phase jitter tracker and cancelling means for tracking and substantially cancelling at least one phase jitter component of the received echo;
   the receiver means further including means for processing the incoming signals after the echoes have been substantially cancelled,
   wherein the echo cancelling means includes a second order phase locked loop ("PLL") which generates a carrier loop frequency signal $\theta_f$ and a carrier loop phase signal $\theta_p$, the phase jitter tracking and cancelling means generating a phase jitter signal $\theta_j$, and the echo cancelling means further comprising means for summing the $\theta_f$, $\theta_p$ and $\theta_j$ signals to generate a total phase signal $\theta$, the echo cancelling means generating an echo replica signal based on the $\theta$ signal which corresponds to the phase of the received echo.

2. The modem of claim 1 wherein the echo cancelling means further includes means for cancelling the phase jitter signal $\theta_j$ from an input signal used by the second order PLL to generate the $\theta_f$ and $\theta_p$ signals thus minimizing the effect of the phase jitter component on the operation of the PLL.

3. A modem comprising:
   transmitter means for converting digital data into a transmit ("TX") signal and for transmitting the TX signal via a channel;
   receiver means coupled to the channel for receiving incoming signals transmitted from a remote modem, the incoming signals including an echo of the TX signal, thus forming a received echo;
   echo cancelling means coupled to the receiver means for substantially cancelling the received echo, the echo cancelling means including phase jitter tracker and cancelling means for tracking and substantially cancelling at least one phase jitter component of the received echo;
   the receiver means further including means for processing the incoming signals after the echoes have been substantially cancelled,
   wherein the echo cancelling means includes an output consisting of an echo replica signal, a first input consisting of the digital data and a second input based on a residue signal, the residue signal resulting from subtracting the echo replica signal from the combined incoming signal and echo, and means for adjusting the phase of the second input signal so that at least one phase jitter component is substantially cancelled from the second input.

4. The modem of claim 3 wherein the echo cancelling means further comprises means for adjusting the phase of the echo replica signal based on the phase jitter component so that the replica signal and the echo have substantially the same phase.

5. An apparatus that minimizes echoes based on previously transmitted signals that are received as part of incoming signals, the apparatus comprising:
   means for generating an echo replica signal based on the transmitted signals and a feedback signal;
   phase jitter tracker means for determining at least one phase jitter component of the received echoes;
   means coupled to the determining means for substantially eliminating the at least one phase jitter component from the feedback signal;
   means coupled to the determining means for adding the phase jitter component to the replica signal, thus forming a cancellation signal;
   means for subtracting the cancellation signal from the incoming signals thereby generating the feedback signal which has minimized echoes from a first set of echo components,
   and further comprising a second echo cancellation apparatus, the second echo cancellation apparatus comprising:
   means for generating a second echo replica based on the transmitted signals and further based on a second feedback signal; and
   means for subtracting the second echo replica from the incoming signals, thereby generating the second feedback signal which has minimized echoes from a second set of echo components,
   and further comprising means for subtracting the cancellation signal from the second feedback signal to produce an improved second feedback signal which has minimized echoes from the first and second sets of echo components.

6. An apparatus that minimizes echoes based on previously transmitted signals that are received as part of incoming signals, the apparatus comprising:
   means for generating an echo replica signal based on the transmitted signals and a feedback signal;
   phase jitter tracker means for determining at least one phase jitter component of the received echoes;
   means coupled to the determining means for substantially eliminating the at least one phase jitter component from the feedback signal;
   means coupled to the determining means for adding the phase jitter component to the replica signal, thus forming a cancellation signal;
   means for subtracting the cancellation signal from the incoming signals thereby generating the feedback signal which has minimized echoes from a first set of echo components,
   and further comprising means for calculating the phase difference between the cancellation signal and the incoming signal, the determining means determining the phase jitter of the at least one component based on the phase difference.

7. A method for minimizing echoes of previously transmitted signals in a modem, the method comprising the steps of:
   (a) converting digital data into transmit ("TX") signals and transmitting the TX signals over a channel;

(b) substantially cancelling echoes of the TX signals received on the channel together with incoming signals transmitted from a remote modem, including steps of phase jitter tracking and substantially cancelling at least one phase jitter component of the echoes: and.

(c) processing the incoming signals after the echoes have been substantially cancelled, wherein the echo cancelling step (b) includes the steps of generating a carrier loop frequency signal $\theta_f$ and a carrier loop phase signal $\theta_p$, the phase jitter tracking and cancelling step generating a phase jitter signal $\theta_j$, and the echo cancelling step further comprising a step of summing the $\theta_f$, $\theta_p$ and $\theta_j$ signals to generate a total phase signal $\theta$, the echo cancelling step comprising a step of generating an echo replica signal based on $\theta$ which corresponds to the phase of the received echo.

8. The method of claim 7 wherein the echo cancelling step further includes the step of cancelling the phase jitter signal $\theta_j$ from an input signal used to generate the $\theta_f$ and $\theta_p$ signals, thereby minimizing the effect of the phase jitter component.

9. The method of claim 8 wherein the echo cancelling step includes the step of generating an echo replica signal that does not include the phase jitter component, a step of generating a compensated replica signal that includes the phase jitter component, and a step of summing the compensated replica signal with the incoming signal and echo, thereby substantially cancelling the echo signal.

10. The method of claim 9 wherein the echo cancelling step includes a step of generating an output consisting of an echo replica signal, a step of receiving a first input consisting of the digital data and a second input based on a residue signal resulting from subtracting the echo replica signal from the combined incoming signal and echo, and a step of adjusting the phase of the second input signal to the echo cancelling means so that at least one phase jitter component is substantially cancelled from the second input.

11. The method of claim 10 wherein the echo cancelling step further comprises the step of adjusting the phase of the echo replica signal based on the phase jitter component so that the replica signal and the echo have substantially the same phase.

12. A method for minimizing echoes corresponding to previously transmitted signals that are received as part of incoming signals, the method comprising the steps of:

(a) generating an echo replica signal based on the transmitted signals and a feedback signal:

(b) phase jitter tracking and determining at least one phase jitter component of the received echoes, thus forming a phase jitter determination:

(c) based on the phase jitter determination, substantially eliminating the phase jitter from the feedback signal:

(d) based on the phase jitter determination, adding the phase jitter component to the replica signal to form a cancellation signal:

(e) subtracting the cancellation signal from the incoming signals thus generating the feedback signal which has minimized echoes, further including a step of calculating the phase difference between the cancellation signal and incoming signal; and a step of determining the at least one phase jitter component based on the phase difference.

* * * * *